United States Patent
Poti et al.

(10) Patent No.: US 7,039,270 B2
(45) Date of Patent: May 2, 2006

(54) OPTICAL TRANSMISSION SYSTEM

(75) Inventors: Luca Poti, Parma (IT); Antonella Bogoni, Mantova (IT)

(73) Assignee: Marconi Communications S.p.A., Genoa (IT)

( * ) Notice: Subject to any disclaimer, the term of this patent is extended or adjusted under 35 U.S.C. 154(b) by 0 days.

(21) Appl. No.: 10/344,540

(22) PCT Filed: Aug. 2, 2001

(86) PCT No.: PCT/IB01/01709

§ 371 (c)(1),
(2), (4) Date: Jul. 31, 2003

(87) PCT Pub. No.: WO02/15450

PCT Pub. Date: Feb. 21, 2002

(65) Prior Publication Data

US 2004/0033013 A1 Feb. 19, 2004

(30) Foreign Application Priority Data

Aug. 18, 2000 (IT) .................... TO2000A0809

(51) Int. Cl.
*G02B 6/28* (2006.01)
*H04B 10/18* (2006.01)

(52) U.S. Cl. ............................. 385/24; 398/42; 398/43; 398/69; 398/79; 398/82

(58) Field of Classification Search .................. 385/24, 385/123–128; 398/42, 43, 69, 79, 82
See application file for complete search history.

(56) References Cited

U.S. PATENT DOCUMENTS 5,410,624 A * 4/1995 Morkel ........................ 385/24
6,118,563 A * 9/2000 Boskovic et al. .............. 398/1
6,501,877 B1 * 12/2002 Weverka et al. .............. 385/31
6,545,780 B1 * 4/2003 Takachio et al. ................ 1/1
2001/0033412 A1 * 10/2001 Vavassori et al. ......... 359/341.3

FOREIGN PATENT DOCUMENTS

| EP | 0 880 249 A2 | * 11/1998 |
| EP | 0 892 524 A2 | 1/1999 |
| JP | 0 880 249 | * 11/1998 |
| JP | 11-88393 | 3/1999 |
| JP | 2000-224108 | 8/2000 |
| WO | WO 00/31910 | 6/2000 |

OTHER PUBLICATIONS

*Simple Channel Plan to Reduce Effects of Nonlinearities in Dense WDM Systems*, H. P. Sardesai, et al., Summaries of Papers Presented at the Conference on Lasers and Electro–Optics. Cleo 99. Technical Digest, Postconference Edition, Baltimore, MD, May 23–28, 1999, Conference on Lasers and Electro–Optics.

* cited by examiner

*Primary Examiner*—Frank G. Font
*Assistant Examiner*—Christopher M. Kalivoda
(74) *Attorney, Agent, or Firm*—Kirschstein, et al.

(57) ABSTRACT

A device wavelength division multiplex optical transmission system has the wavelengths of the optical carriers arranged so as to reduce the effect of in-band crosstalk which results from unwanted side bands to the carriers. Possible wavelengths are placed on an equally spaced wavelength grid, and the transmitted channels are organized into groups of three each of which is placed on four adjacent grid positions, one of which is unused. Adjacent groups are spaced apart by two or more vacant grid positions.

7 Claims, 2 Drawing Sheets

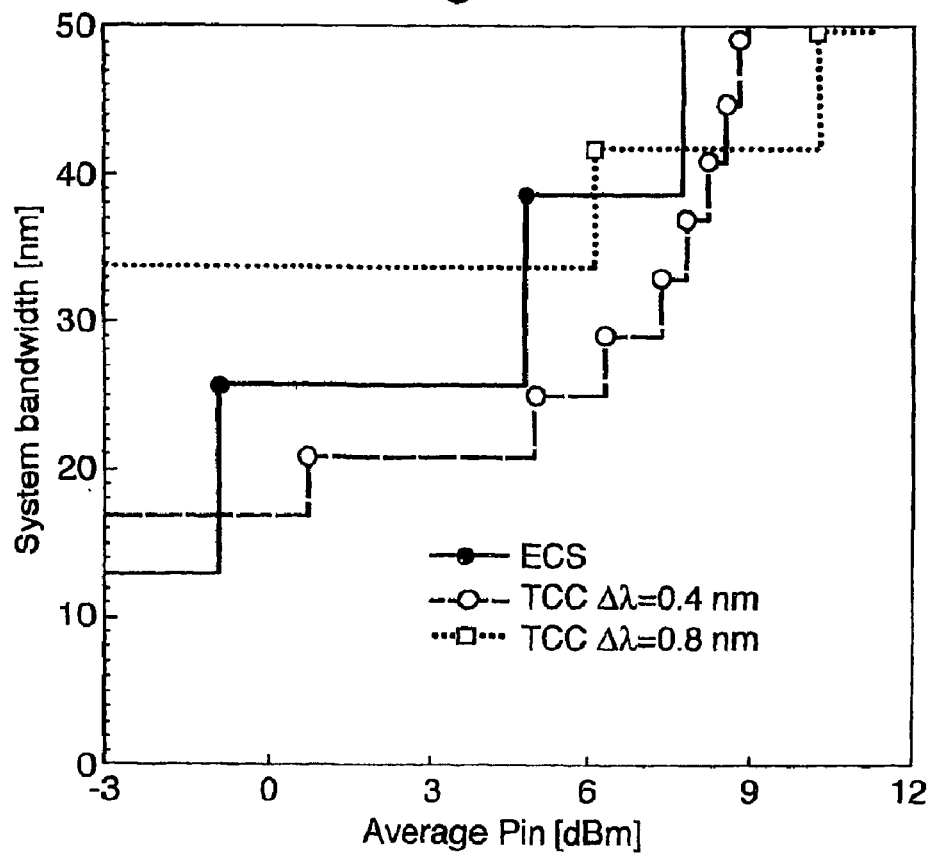

US 7,039,270 B2

OPTICAL TRANSMISSION SYSTEM

BACKGROUND OF THE INVENTION

This invention relates to an optical transmission system, and more particularly to such a system in which light is transmitted over a single optical fibre at a number, possibly a large number, of different wavelengths, with each wavelength, or 'colour' of light carrying a separate optical communication channel. Such a system is often referred to as a Dense Wavelength Division Multiplex (DWDM) system. One of the effects of fibre transmission characteristics, such as non-linearity, is to degrade the shape of pulses of light transmitted within each channel and to generate undesirable side bands at wavelengths which could differ from the wavelength which is launched at the beginning of a fibre. These side bands can coincide with adjacent transmitted wavelengths (ie slightly different colours) and so interfere with adjacent channels to cause corruption of the pulses transmitted at these other wavelengths.

It is necessary to minimise the channel spacing in DWDM systems so as to accommodate a large number of channels in the available overall bandwidth. In order to maximise the use of the available bandwidth, equal channel spacing on a grid specified by the ITU is frequently adopted, but equal channel spacing is sensitive to unwanted side bands as these can appear as in-band crosstalk disturbances that reduce the signal to crosstalk ratio.

The suppression of all in-band crosstalk terns implies an unequal channel spacing allocation that requires a prohibitively large system bandwidth.

The present invention seeks to provide an improved optical transmission system.

SUMMARY OF THE INVENTION

According to this invention, an optical transmission system includes an optical transmitter and an optical fibre, the transmitter being arranged to transmit along the fibre a plurality of optical channels each at a different wavelength placed on an equally spaced wavelength grid, the channels being organised into groups of three, each of which is placed on four adjacent grid positions, one position of which is unused, with adjacent groups being spaced apart from each other by two or more vacant grid positions.

BRIEF DESCRIPTION OF THE DRAWINGS

The invention is further described by way of example with reference to the accompanying drawings, in which:

FIG. 3 is a diagram showing one of the groups of FIG. 2 with three wavelengths; and FIG. 4 is a plot of system bandwidth versus average input signal power.

DETAILED DESCRIPTION OF THE PREFERRED EMBODIMENTS

Figure 1:
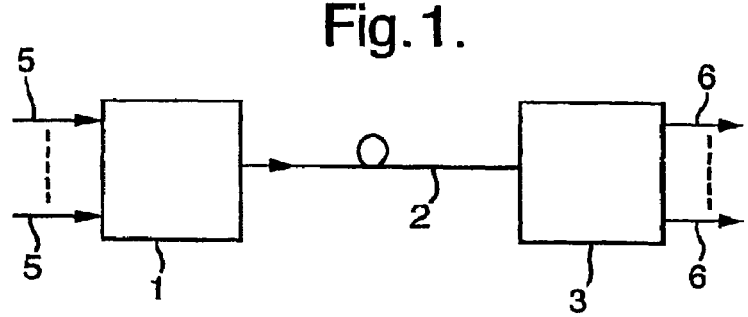
FIG. 1 shows an optical transmission system according to this invention.

Referring to FIG. 1, an optical transmission system includes an optical transmitter 1 which sends optical communication signals over an optical fibre 2 to an optical receiver 3. The fibre 2 typically can be in excess of 100 kilometres in length, and carries a large number of different communication channels, each at a different wavelength, or colour. Such a system is known as a DWDM system in view of the large number, typically thirtytwo or more, of wavelengths used. The individual thirtytwo communication channels 5 are received at the transmitter 1, and multiplexed together in DWDM for transmission over the single fibre 2 to the receiver 3, where the individual channels 6 are made available at output ports.

In this example, the optical fibre is a non-zero dispersion fibre (NZDSF), and high input channel powers induce non-linear phenomena but degrading the pulse shape. Such a fibre generates what is termed four wave mixing (FWM), which represents undesirable side bands.

Unwanted side bands can also be generated by so-called zero-dispersion fibre.

The optical fibre 2 has an available bandwidth, and there are predetermined discrete wavelengths which can be used for the different channels. These discrete wavelengths correspond to an equal-spaced grid which is specified by the ITU, and the use of an equal channel spacing gives rise to four wave mixing components which causes in-band crosstalk disturbances. The invention substantially reduces this difficulty by the use of a three channel code (TCC) which is represented diagrammatically in FIG. 2.

Figure 2:
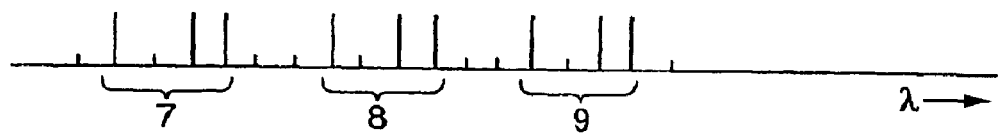
FIG. 2 is a diagram depicting multiple three-channel groups for use with the system of FIG. 1.

In this figure, a standard ITU equal channel spacing grid is shown on the wavelength $\lambda$ axis, but the optical channels are organised into groups of three wavelengths, of which three such groups 7, 8, 9 are shown. Each group occupies four grid positions, so that one grid position within each group is vacant and the first and last grid positions in each group are occupied. As many groups are provided as is required for the total number of channels to be transmitted. Each group is separated from its adjacent group by two or more vacant grid positions k. In FIG. 2, k=2, as there are two vacant grid positions between adjacent groups. In order to make efficient use of the available bandwidth, k should be small, but k can be larger, eg k=3 or k=4 to further reduce undesirable crosstalk disturbances, but at the penalty of less efficient use of the bandwidth.

The FWM power $P_{ijk}$, generated by three continuous wave channels of input powers $P_i$, $P_j$, $P_k$ at frequencies $f_i$, $f_j$, and $f_k$ at the output of a fibre with attenuation $\alpha$ and length z is $$P_{ijk} = d_{ijk}{}^2 \gamma^2 L_{eff}^2 P_i P_j P_k \eta_{ijk} e^{-\alpha z} \tag{1}$$

where $d_{ijk}$ is the degeneracy factor, taking value 1 or 2 for degenerate and non degenerate terms, respectively, $\gamma$ the non-linear coefficient, $L_{eff}$ the effective length, and $\eta_{ijk}$ the efficiency, which can be approximated for long enough NZDSFs as $\eta_{ijk} \cong \alpha^2/\Delta\beta^2{}_{ijk}$. The phase matching coefficient $\Delta\beta_{ijk}$, away from the zero dispersion region, is $$\Delta\beta_{ijk} = \frac{2\pi c}{\lambda_0^2} D_c \Delta\lambda_{ik} \Delta\lambda_{jk} \tag{2}$$

where $D_c$ is the fibre dispersion and $\Delta\lambda_{ik}$ and $\Delta\lambda_{jk}$ are the wavelength spacing between channels i and k, and j and k. In the case of channels arranged on the ITU grid, $\Delta\beta_{ijk}$ takes the discrete values:

$$\Delta\beta_n = n\left(\frac{2\pi c}{\lambda_0^2}\right)D_c\Delta\lambda^2 \qquad (3)$$

and thus also the efficiency becomes $\eta_n = \eta(\Delta\beta_n)$, where $n=|i-k||j-k|$ is the efficiency order, and $\Delta\lambda$ is the selected ITU grid resolution, typically a multiple of 0.4 nm.

FIG. 3 shows one group of three wavelengths in more detail placed on an equal space grid at slots 1, 3 and 4.

A slot corresponds to the selected grid resolution $\Delta\lambda$. In FIG. 3, all FWM terms are also summarised. Each term is represented by the indices ijk of the three channels involved in the product. For instance, the term 134 falling on slot 0 labels the FWM contribution jointly generated by the channels at slots 1, 3 and 4. For each FWM term, the corresponding efficiency (ie relative magnitude) $\eta_n$, is also marked in FIG. 1. It will be seen that no FWM term falls on the three channels, and the efficiency of the FWM terms decreases with their distance from the "three channel group" composed of slots 1 through 4. The invention adds more channels to the WDM comb by repeating as many three-channel groups as needed, spaced k slots apart from each other as shown in FIG. 2. The bandwidth occupied by an N-channel WDM system is therefore $$B = [4Q + k(Q-1) + (k+R)\min(1, R)]\Delta\lambda \qquad (4)$$

where Q and R are the quotient and the remainder of the division of N by 3, namely $N=3Q+R$. Note that the in-band FWM terms falling on a channel within a specific group appear because of the presence of channels belonging to different groups. Thus, by increasing the slot distance k between adjacent groups, the efficiency of the in-band FWM terms decreases, at the expense of an increase of the system bandwidth B. The fractional bandwidth expansion, defined as $\epsilon_B = B/(N\Delta\lambda) - 1$, can be found, for typically large values of N, as $\epsilon_B \cong (k+1)/3$, and depends only on k. It is easy to verify that the smallest efficiency order n of the in-band FWM terms is 1 when k=0, 4 when k=1, and n=k+4 for k≥2.

At low transmitted power levels, the equal channel spacing (ECS) is the best scheme, i.e., the one that minimises the system bandwidth. As the per channel power increases, the signal-to-crosstalk ratio (SXR) quickly decreases below a tolerable threshold value $SXR_{min}$ for some channels of the comb.

The resulting ECS system bandwidth, for a N=32 channel system, is plotted in solid line in FIG. 4 versus the average input channel power. The low power grid resolution is 0.4 nm, increasing in steps of 0.4 nm at each discontinuity in the curve.

FIG. 4 also shows the system bandwidth of the TCC schemes, for the same system and fibre parameters. Consider first the TCC with grid resolution 0.4 nm, dashed line. As the power increases, $SXR_{min}$ is reached by some channels, and the island distance k is increased by one unit at each discontinuity, starting at low-power with k=0. Up to average input power per channel $P_{in}$=−1 dBm the ECS is the best scheme. For higher power values, up to about 9 dBm, the TCC with ITU grid resolution 0.4 nm is the most efficient in terms of system bandwidth.

However, as the island spacing k becomes large, even the TCC becomes inefficient, and a way of recovering bandwidth efficiency is to adopt a TCC scheme with a higher grid resolution, i.e., by enlarging the grid slots. The system bandwidth for the TCC scheme with resolution 0.8 nm is also shown in the FIG. 4 in dotted line.

What is claimed is:

1. A wavelength division multiplex optical transmission system, comprising: an optical transmitter for transmitting along an optical fiber at least six optical channels each at a respective different wavelength and each wavelength being allocated from an equally spaced wavelength grid; said optical channels being organized into groups of three in which each of the optical channels of each group is allocated a respective wavelength corresponding to one of four adjacent grid positions, the optical channels of each group of three being allocated to wavelengths corresponding to the first and last grid positions of said four adjacent grid positions, and one of said remaining grid positions being vacant, and wherein adjacent groups of optical channels are spaced apart from each other by two adjacent vacant grid positions.

2. The wavelength division multiplex optical transmission system as claimed in claim 1, wherein said vacant grid position in each group of three optical channels occurs at the second grid position for all groups.

3. The wavelength division multiplex optical transmission system as claimed in claim 1, wherein said vacant grid position in each group of three optical channels occurs at the third grid position for all groups.

4. The wavelength division multiplex optical transmission system as claimed in claim 1, wherein the grid spacing is 0.4 nm.

5. The wavelength division multiplex optical transmission system as claimed in claim 1, wherein the grid spacing is 0.8 nm.

6. The wavelength division multiplex optical transmission system as claimed in claim 1, wherein at least sixteen optical channels are provided.

7. The wavelength division multiplex optical transmission system as claimed in claim 1, wherein the optical fiber is a non-zero dispersion fiber.

* * * * *

UNITED STATES PATENT AND TRADEMARK OFFICE
CERTIFICATE OF CORRECTION

| | | |
|---|---|---|
| PATENT NO. | : 7,039,270 B2 | Page 1 of 1 |
| APPLICATION NO. | : 10/344540 | |
| DATED | : May 2, 2006 | |
| INVENTOR(S) | : Poti et al. | |

It is certified that error appears in the above-identified patent and that said Letters Patent is hereby corrected as shown below:

On the Title Page, Item (56), under "FOREIGN PATENT DOCUMENTS", delete "JP 0 880 249  *  11/1998".

In Column 1, Line 30, delete "terns" and insert -- terms --, therefor.

Signed and Sealed this

Eleventh Day of November, 2008

JON W. DUDAS
*Director of the United States Patent and Trademark Office*